United States Patent [19]
Brown et al.

[11] Patent Number: 5,639,384
[45] Date of Patent: Jun. 17, 1997

[54] APPARATUS AND METHOD FOR IMPROVING GAS BACKWASH IN LATERAL UNDERDRAINS

[75] Inventors: Marvin A. Brown, Sewickley; Eugen O. Bergmann, Evans City; Richard Hsieh, Sewickley, all of Pa.

[73] Assignee: The F.B. Leopold Company, Zelienople, Pa.

[21] Appl. No.: 596,548

[22] Filed: Feb. 5, 1996

Related U.S. Application Data

[63] Continuation of Ser. No. 226,811, Apr. 12, 1994, Pat. No. 5,489,388.

[51] Int. Cl.⁶ .................................. B01D 24/46
[52] U.S. Cl. ............ 210/794; 210/274; 210/275; 210/293
[58] Field of Search ..................... 210/793, 794, 210/795, 274, 275, 293, 541

[56] References Cited

U.S. PATENT DOCUMENTS

| | | | |
|---|---|---|---|
| 274,339 | 3/1883 | Kalfus | 210/472 |
| 2,710,692 | 6/1955 | Kegel et al. | 210/274 |
| 3,468,422 | 9/1969 | Camp | 210/274 |
| 3,533,507 | 10/1970 | Aitken | 210/140 |
| 4,064,050 | 12/1977 | Heaney et al. | 210/293 |
| 4,065,391 | 12/1977 | Farabaugh | 210/274 |
| 4,118,322 | 10/1978 | San Roman | 210/136 |
| 4,196,079 | 4/1980 | Ward | 210/80 |
| 4,214,992 | 7/1980 | Sasano et al. | 210/274 |
| 4,331,542 | 5/1982 | Emrie | 210/794 |
| 4,435,286 | 3/1984 | Louboutin et al. | 210/116 |
| 4,476,020 | 10/1984 | Cheetham | 210/289 |
| 4,604,197 | 8/1986 | Louboutin et al. | 210/150 |
| 4,608,168 | 8/1986 | Moore | 210/274 |
| 4,707,257 | 11/1987 | Davis et al. | 210/274 |
| 4,923,606 | 5/1990 | Gresh et al. | 210/275 |
| 4,925,556 | 5/1990 | Gaudin et al. | 210/293 |
| 5,019,259 | 5/1991 | Hambley | 210/274 |
| 5,028,322 | 7/1991 | Soriente | 210/232 |
| 5,068,034 | 11/1991 | Walter | 210/232 |
| 5,087,362 | 2/1992 | Brown | 210/293 |
| 5,108,627 | 4/1992 | Berkebile et al. | 210/793 |
| 5,149,427 | 9/1992 | Brown et al. | 210/274 |
| 5,156,738 | 10/1992 | Maxson | 210/274 |
| 5,160,614 | 11/1992 | Brown | 210/275 |
| 5,232,592 | 8/1993 | Brown et al. | 210/274 |
| 5,269,920 | 12/1993 | Brown et al. | 210/274 |
| 5,328,608 | 7/1994 | Bergmann et al. | 210/274 |
| 5,489,388 | 2/1996 | Brown et al. | 210/794 |

FOREIGN PATENT DOCUMENTS

| | | |
|---|---|---|
| 0336686 | 10/1989 | European Pat. Off. |
| 57-86611 | of 1982 | Japan |
| 57-95210 | of 1982 | Japan |

OTHER PUBLICATIONS

International Search Report dated Sep. 6, 1994 for International Application No. PCT/US 94/05244.

*Primary Examiner*—Ivars Cintins
*Attorney, Agent, or Firm*—Webb Ziesenheim Bruening Logsdon Orkin & Hanson, P.C.

[57] ABSTRACT

An apparatus and method for gas backwashing a granular media supported upon a lateral underdrain is disclosed. The lateral underdrain includes a plurality of dispersion apertures therethrough and at least one liquid return conduit extending to a discharge at a level below the dispersion apertures. The present invention provides for equal distribution of backwash gas across the entire lateral underdrain by directing backwash gas through the dispersion apertures into the granular media and directing liquid from the granular media through the liquid return conduit without obstructing backwash gas flow through said apertures from a gas pocket formed underneath said apertures.

9 Claims, 11 Drawing Sheets

APPARATUS AND METHOD FOR IMPROVING GAS BACKWASH IN LATERAL UNDERDRAINS

This application is a continuation of application Ser. No. 08/226,811, filed Apr. 12, 1994, now U.S. Pat. No. 5,499,388.

BACKGROUND OF THE INVENTION

1. Field of the Invention

The present invention relates to an apparatus and method to improve gas backwash, typically air backwash, in filters with combined gas/liquid (e.g., air/water) lateral type underdrain systems.

2. Prior Art

It is conventional in filters, such as gravity filters having a bed of filter media for treating water and wastewater, to provide an underdrain beneath the filter media for conveying filtered liquid out of the filter and for periodically distributing a cleansing liquid and/or gas to "backwash" the filter media, providing longer filter life. In air/water backwashing of filters with dual lateral air/water underdrain systems, such as disclosed in U.S. Pat. No. 4,065,391 to Farabaugh, it has been found desirable to have an air-only step in a sequence of air and water combinations. The air is applied beneath the filter media, and it vigorously agitates and breaks up dirt in the filter media in its ascent to the surface. The dirt is then more easily removed from the filter during water backwash. Net water usage is thus decreased. It has become quite common for gravity filter designers and users to specify an initial air-only backwash segment or phase when requesting vendors to supply new or retrofitted filter underdrain equipment, because it lowers overall operating and installation costs. Gases or liquids in place of or in addition to air or water may also be used for backwashing filters, but for simplicity, "air" and "water" will be used interchangeably with "gas" or "liquid" throughout this specification.

In the air-only backwash phase, the lateral underdrain and filter media are typically submerged in the process water. Air is pumped into the underdrain, and the pressurized air forms a pocket in the water below the upper deck or top wall of the underdrain. The air escapes through dispersion apertures in the upper deck and rises through the media to the water surface. On its way it rigorously separates the dirt from the media.

To maximize filter performance and operating longevity, it is important that the air/water lateral underdrain supporting the filter media meet the following design objectives:

a. provide close spacing of filtrate collection and backwash air/water distribution apertures (openings) in the top deck of the lateral underdrain system;

b. engage both backwash air and water to the maximum filter media area and depth to avoid pockets of unengaged media; and c. provide distribution apertures which are sufficiently large to prevent clogging.

The referenced Farabaugh underdrain accomplishes these objectives by passing both backwash water and backwash air through the same apertures, which are primarily designed for water distribution, in the top deck of the underdrain. However, we have recently discovered that dual use of apertures in the Farabaugh underdrain has led to a phenomenon known as "drag water return" during air-only backwashing. Previously unknown to the inventors and others skilled in the art, this phenomenon has impeded the ability of the Farabaugh underdrain to achieve its maximum distribution potential during air-only backwash, especially at lower air flow rate. It has also limited the lower end of the range of backwash air flow rates under which the underdrain can properly distribute air. Experience has shown the Farabaugh underdrain requires a minimum air flow rate of 3 cubic feet per minute per square foot ("cfm/ft$^2$") to achieve proper air backwash distribution.

Due to the dual use feature, the dispersion apertures in Farabaugh must be sized so that their total cross-sectional area is able to provide proper headloss for both backwash water and backwash air. Enlarging the cross-sectional area will result in poor air distribution, and downsizing or reducing the cross-sectional area will cause the pressure drop during water backwash to be too high. Particularly, any underdrain system must be designed on the basis of a certain minimum hydraulic headloss to establish optimum backwash water distribution. For fluidized media applications, such headloss must generally be greater than the clean filter media headloss at its incipient water fluidization point, where full media fluidization is expected (e.g., 10–30 gallons per minute per square foot ("GPM/ft$^2$")). On the other hand, the backwash water headloss must not be so high as to require undue energy to achieve appropriate backwash water flow. Conventional lateral underdrain systems will provide optimum water backwash performance up to a maximum headloss of water through the entire underdrain, including passage through the discharge apertures into the media, of 15–40 inches of water column at about 20 GPM/ft$^2$ backwash flow rate. This is roughly the maximum conventional headloss under which most current lateral underdrains will efficiently perform on water backwash. Higher headloss results in a great waste of energy and increases the power requirements and pump sizing for a water treatment process. These general headloss guidelines at common liquid backwash flow rates establish the specific number and size of all discharge aperture openings in the top deck of the lateral underdrain. Preferably, the sizing and spacing for the apertures may be maintained the same for all applications of the underdrain to simplify design and manufacturing requirements.

When the apertures which distribute backwash air are the same as the optimum sized and spaced non-clog apertures which distribute backwash water, the headloss through such top deck apertures distributing air is significantly lower because of the much lower density of air. This lower headloss is enough to form an air pocket beneath the top deck, but it does not allow a sufficiently deep air pocket to form in front of the apertures so that air and water can effectively separate before entering the aperture.

We have recently discovered that the high velocity air by its jet action will drag some liquid through the pocket and up through the dispersion apertures to the media side of the lateral, creating a pressure void in the conduit or lateral chamber below the top deck. This pressure void causes an equivalent water amount to return continuously downward through the dispersion apertures to maintain pressure equilibrium on either side of the underdrain's top deck. Such "drag water return" will block some apertures in the top deck from distributing any air at all, and others will distribute air only intermittently. This phenomenon has been confirmed using dye tests in a transparent pilot filter, both with and without the features of the present invention.

Several additional U.S. patents disclose combined air/water lateral underdrains, including U.S. Pat. Nos. 5,160,614; 5,156,738; 5,149,427; 5,108,627; 5,087,362; 5,068,034; 5,019,259; 4,331,542; 4,214,992; 4,196,079; 4,064, 050; 3,468,422; and 2,710,692. However, none of the prior art of which we are aware at this time addresses the problem of drag water return during air-only backwashing in underdrains which utilize the same apertures for both air and water distribution.

Thus, it is an object of the present invention to avoid air blockage in certain apertures in the top deck of an air/water underdrain lateral during air-only backwashing. It is a further object to provide a passage for unobstructed drag water return from above the underdrain to below the pressurized air blanket. It is a still further object to significantly improve the backwash air distribution when using the same apertures to disperse both backwash water and backwash air, without impeding the filtrate collection and backwash water distribution performance of the lateral underdrain. Finally, it is an object of the present invention to improve backwash air distribution at very low air-only rates, such as 1–2 cfm/ft$^2$ over both short and long lateral lengths. Backwashing at lower air-only rates is sometimes desirable to enable the use of blower equipment with lower ratings, thus reducing the installation and operational costs associated with air backwashing systems.

SUMMARY OF THE INVENTION

The present invention provides an underdrain distributor to be positioned on a filter bottom and for use in a filter system having a combined gas/liquid lateral underdrain with a granular media disposed above the underdrain distributor. Liquid may be supplied to the granular media and passed down through the media to the underdrain distributor. The underdrain distributor includes a plurality of exterior walls defining a hollow interior. The exterior walls include a top wall and a pair of sidewalls extending between the top wall and the filter bottom. A plurality of dispersion apertures are formed in the top wall providing fluid communication between the hollow interior and the media. The present invention provides at least one liquid return conduit in the underdrain distributor to provide fluid communication between the hollow interior and the distributor exterior, with a conduit discharge at a level within the hollow interior below the plurality of dispersion apertures. Particularly, the conduit discharge is located so that liquid exterior to a gas pocket formed beneath the top wall may return to the distributor interior without obstructing gas backwash flow.

A presently preferred embodiment of the present invention includes a plurality of interior walls dividing the interior into a primary horizontal conduit and at least one secondary horizontal conduit positioned adjacent the primary horizontal conduit with each aperture in the top wall being in communication with one of the secondary horizontal conduits. In this embodiment, the liquid return conduit may be formed as a trough in the top wall with at least one orifice positioned in a lower portion of the trough communicating with a secondary horizontal conduit. Alternatively, the liquid return conduit may be formed as a tube extending from the top wall to the interior of the secondary horizontal conduit.

Another presently preferred embodiment includes a liquid return conduit in the form of an orifice positioned in an upper portion of at least one of the distributor's sidewalls. A downwardly extending baffle may be located adjacent the orifice in the interior of the underdrain distributor. The baffle screens the gas pocket from communication with the orifice.

The present invention also provides a method for backwashing a granular media disposed above a lateral underdrain, with the underdrain including a plurality of apertures therethrough, and at least one liquid return conduit extending to a discharge in the underdrain interior at a level below the apertures. The underdrain and the granular media are submerged in a process liquid. The method of backwashing includes: supplying a backwash gas to the underdrain so that a backwash gas pocket is formed between the apertures and the liquid return conduit discharge; directing the backwash gas through the apertures to the granular media; and conveying liquid which is exterior to the gas pocket through the liquid return conduit to the liquid return conduit discharge. This method provides for an even distribution of backwash gas through the apertures over the entire filter bottom and minimizes the partial or random disruption of the gas flow due to the return of liquid from the granular media side or distributor exterior to the distributor interior.

Further details and advantages of the present invention will become apparent from the following description in conjunction with the accompanying drawings, wherein like reference numerals indicate like elements throughout.

DETAILED DESCRIPTION OF THE PREFERRED EMBODIMENTS

Figure 1:
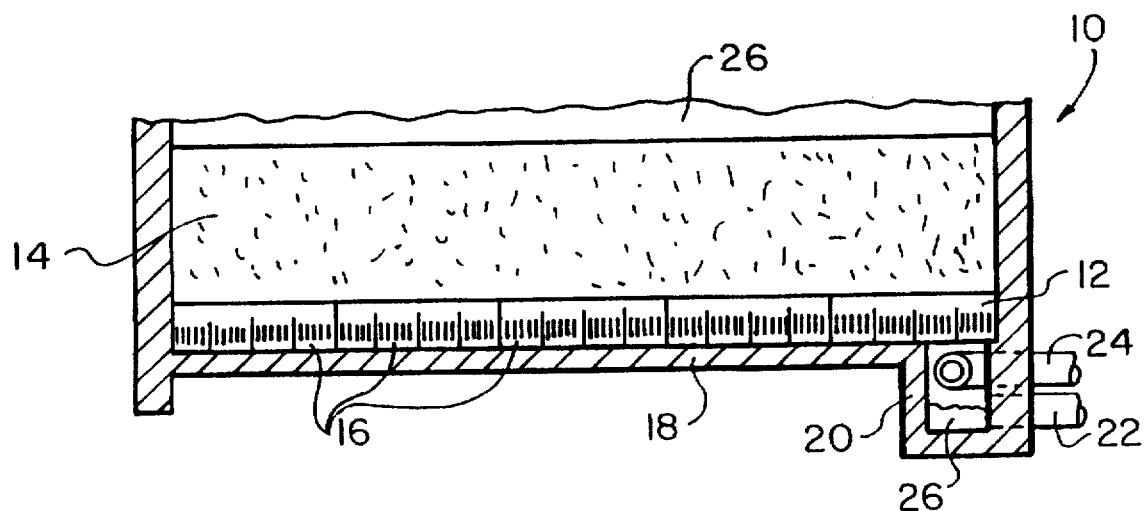
FIG. 1 is a schematic view of a filter having a lateral underdrain system according to the present invention.

FIG. 1 illustrates a gravity filter 10 having a lateral underdrain 12 supporting a bed of granular media 14. The lateral underdrain is comprised of a plurality of filter underdrain blocks 16 arranged end to end in parallel adjacent rows across a filter bottom 18. The gravity filter 10 includes a flume 20 with a backwash water inlet 22 and a backwash air inlet 24.

Gravity filter 10 is shown schematically in a backwash air-only mode, wherein process water 26 is present in the filter. The granular media 14 is also shown schematically and may or may not include a layer of support gravel directly above the underdrain 12. Further aspects of gravity filters having air/water lateral underdrains, to which the present invention may be applied, may be found in U.S. Pat. No. 4,065,391 to Farabaugh, incorporated herein by reference. The filter blocks 16 include a liquid or "drag water" return conduit, which will be described hereinafter in connection with several specific block embodiments illustrated in FIGS. 2–12.

Figure 2:
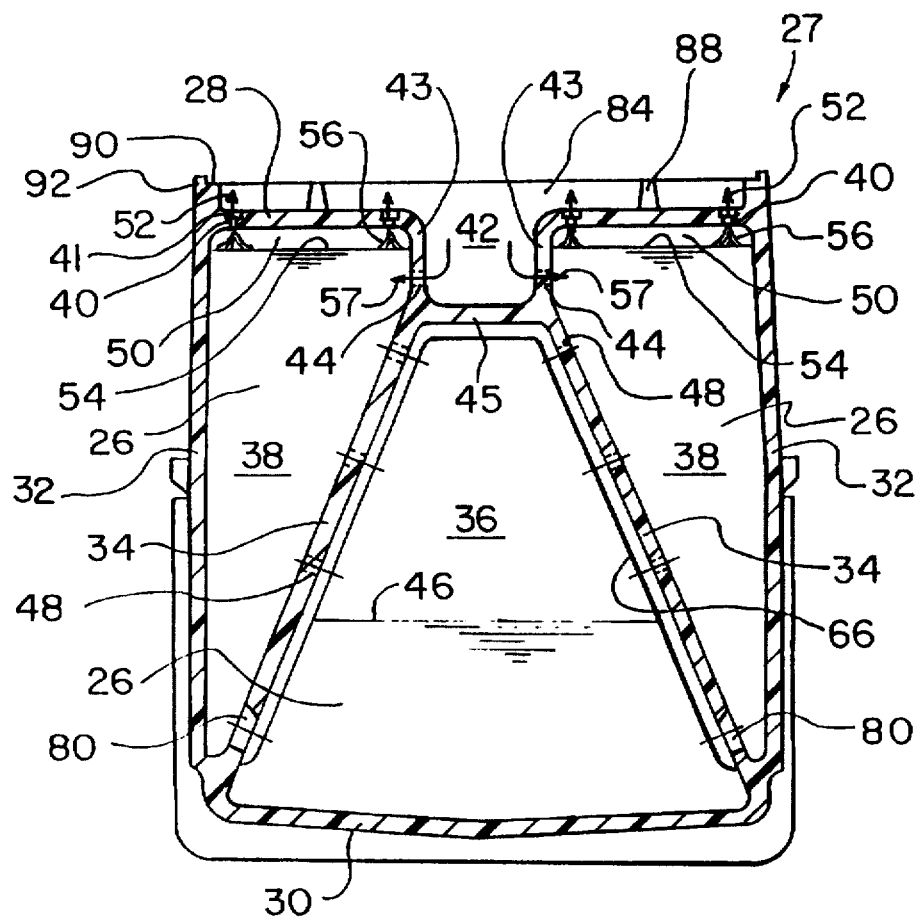
FIG. 2 is a sectional view, taken along lines II—II of FIG. 3 of a first preferred embodiment of a filter underdrain block of the present invention.

The first embodiment of the present invention is illustrated in FIGS. 2–7. Particularly, FIG. 2 illustrates a block 27 having a top wall 28, bottom wall 30, and a pair of opposed side walls 32 extending between top wall 28 and bottom wall 30. A plurality of internal walls 34 divide the hollow interior of the block 27 into a primary horizontal conduit 36 and two secondary horizontal conduits 38, positioned on opposed sides of the primary horizontal conduit 36.

Figure 3:
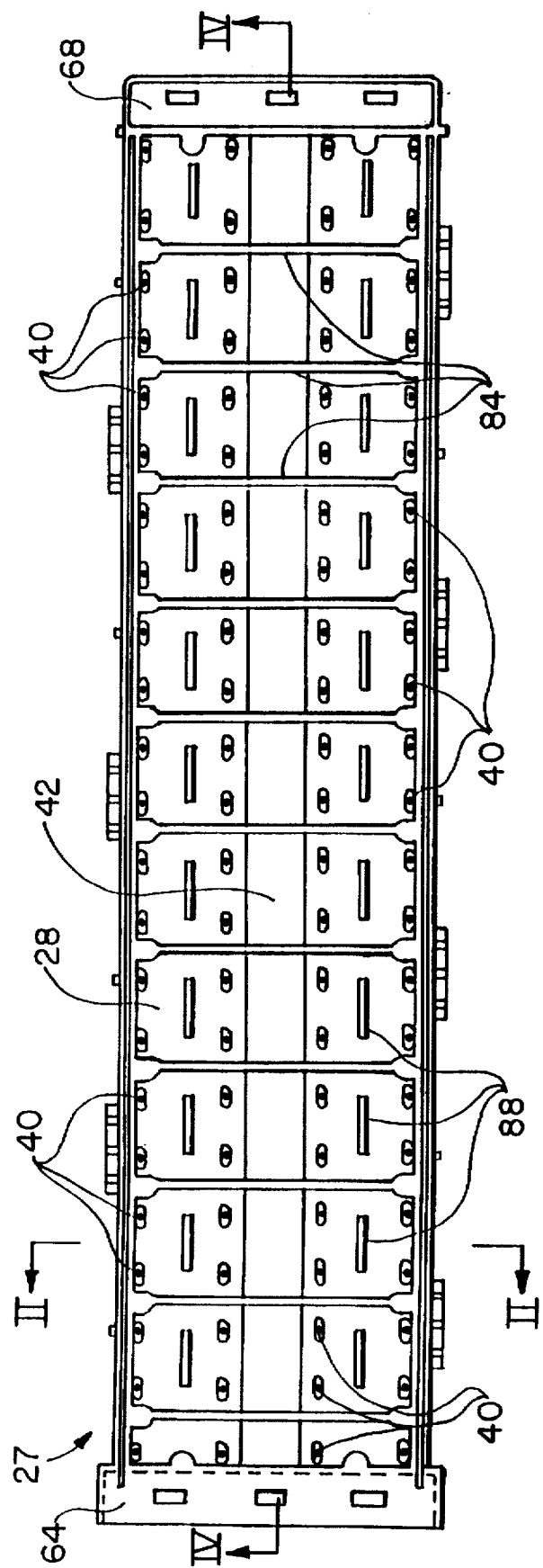
FIG. 3 is a plan view of a filter underdrain block according to a first embodiment to the present invention.

Top wall 28 includes a plurality of dispersion apertures 40 which are slightly recessed from the outer surface of the top wall in counter sinks 41. A preferred block 27 according to the first embodiment is typically about four feet long and includes 92 dispersion apertures 40, evenly spaced across the top wall 28 thereof. The dispersion apertures 40 are preferably but not exclusively $7/32$" to $1/4$" in diameter. The top wall 28 is approximately 9" wide, and dispersion apertures 40 are spaced at a frequency of 23 apertures per lineal foot of the underdrain block 27, as shown in FIG. 3.

A trough 42 is centrally located in top wall 28, and a plurality of orifices 44 are positioned on each side of the trough near the bottom wall 45 of the trough. The orifices 44 serve as drag water return conduits, as discussed in further detail below. In the current preferred embodiment, these orifices are $1/4$" in diameter, and six orifices are located on each side 43 of the trough 42. The orifices 44 are linearly spaced on 8" centers along the longitudinal axis of block 27. Furthermore, the orifices 44 are staggered so that they are not symmetrically opposed from one another on opposing trough sides 43.

In the filtration mode, water to be filtered comes downward through granular media 14 into non-clog dispersion apertures 40 and trough orifices 44. From there, the water passes to secondary conduits 38 and then to primary conduits 36. Primary conduits 36 are connected to a collection flume 20, which in turn conveys the filtered liquid to a clearwell (not shown) for distribution to the consumer.

To ensure maximum filter performance, the granular media 14 must be washed regularly. This is accomplished by pumping clean water back through underdrains 12 and upward through the granular media to dislodge dirt and foreign particles from the granular media. Oftentimes, to prepare the granular media for water backwash, the submerged granular media is first scoured with an air-only backwash, wherein air is pumped upward through underdrain 12, as discussed below. The air-only backwash loosens the dirt and other impurities so that they will be more easily carried off by the subsequent water backwash phase.

Figure 4:
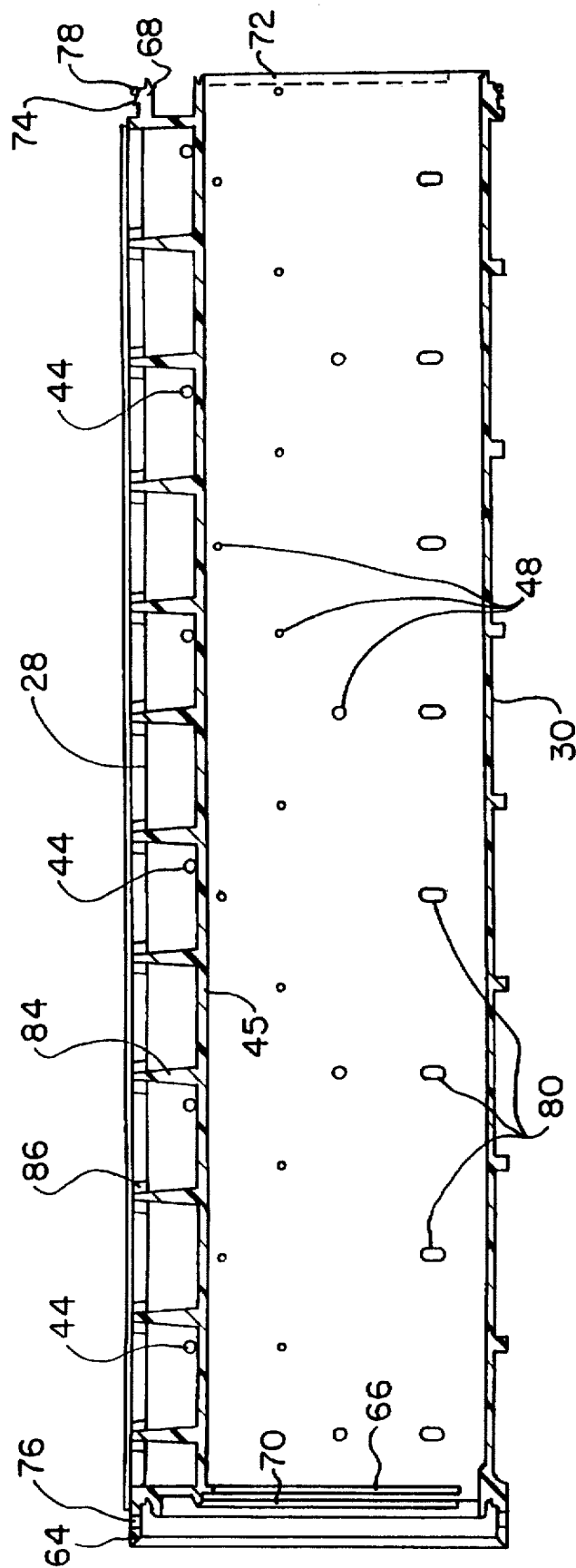
FIG. 4 is a sectional view, taken along lines IV—IV of FIG. 3.

The air-only backwash mode is typically initiated before a concurrent water and air backwash or a water-only backwash mode. At this time, both the underdrain and the overlying granular media are submerged in process water 26. FIG. 2 depicts the air-only mode. Pressurized air is pumped into primary conduit 36 so that a primary conduit air/water interface 46 is established in the primary conduit. Particularly, the interior walls 34 which define primary conduit 36 each include a plurality of air metering orifices 48. The current preferred arrangement of the air metering orifices 48 is best shown in FIGS. 2 and 4. During air-only backwash, air is pumped into the underdrain at the rate of 0.5 to 5 cubic feet per minute per square foot (cfm/ft$^2$). Particularly, air is metered through orifices 48 into secondary conduits 38, where it bubbles through process water 26 therein up towards the top wall 28. Due to the sizing and spacing of dispersion apertures 40, the backwash air experiences a sufficient headloss through dispersion apertures 40 that a gas blanket or pocket 50 is formed directly beneath all the dispersion apertures. Air proceeding through apertures 40 is indicated at arrows 52. Typically, the gas blanket 50 extends to a depth of $1/8$" to $7/8$" beneath top wall 28. The gas blanket forms an additional air/water interface 54 in secondary conduits 38.

As discussed above, in order to maintain an optimal total headloss in the underdrain during high rinse water-only backwash, the top deck dispersion apertures must be sized and spaced primarily so that the headloss across top wall 28 for conventional water backwash rates is properly balanced against the total underdrain headloss requirements. The headloss balancing is an important factor in keeping the hydraulic maldistribution to a minimum. Typically, a lateral underdrain will require that a nominal underdrain headloss be equivalent to about 15–40 inches of water column at a high backwash rinse rate of 20 gallons per minute per square foot (GPM/ft$^2$). This is the range of maximum backwash water headloss under which most conventional lateral underdrains will efficiently perform. However, the invention is not intended to be limited to any particular value for this nominal headloss. The invention is applicable to underdrains wherein all the orifices in the top deck are appropriately sized and spaced for use on both air and water backwash, as in the Farabaugh underdrain.

We have found that after specific air flow has begun and the air/water interface 54 is established, and the balanced air pocket size is developed in the secondary lateral conduit under the dispersion apertures 40 and top wall 28, some amount of water 26 will continue to be dragged by the air stream exiting through the apertures 40 across top wall 28, as shown at 56. This residual "drag water" transfer creates a static pressure imbalance in the underdrain which seeks to equalize itself by immediately returning such drag water to the underdrain. We have designated this phenomenon "drag water return". From specific observations it is clear that during this air-only backwash operation the drag water from above the top wall 28 will indeed return downward, randomly blocking several apertures 40 from passing the backwash air. Thus, several of the apertures across the top wall 28 of the underdrain, in prior art designs, will pass air only intermittently, and others will not pass air at all.

Merely decreasing the cross-sectional area of dispersion apertures 40 to lower the interface 54 is an unsatisfactory solution. Particularly, the reduction in cross-sectional area will always lead to one of three problems: (1) increased headloss during water backwash; (2) decreased coverage of backwash fluids in the bed of granular media, causing dead spots (for example, if spacing is increased and hole size kept the same); or (3) clogging. According to the invention, the drag water return may now proceed through orifices 44 to a position below the gas blanket 50 in secondary conduits 38, as indicated by arrows 57. Particularly, the discharge of orifices 44 is located below gas blanket 50, and the air/water interface 54 screens the orifices 44 from communication with gas blankets 50. Thus, the drag water can return to secondary conduits 38 unobstructed by the gas blanket. The dispersion apertures are sized and spaced and the liquid conduit discharge is located so that the discharge remains out of direct fluid communication with the gas blanket at air backwash flow rates from 0.5 cfm/ft$^2$ to approximately 5 cfm/ft$^2$. Less drag water will seek to return downward through dispersion apertures 40, and the number of apertures so affected by this phenomenon is significantly decreased or altogether eliminated. Distribution of backwash air is thereby substantially improved. Quantitative tests proving the efficacy of the invention are set forth in Examples I–III, below.

The invention is particularly adapted to solve the problem of drag water return in air/water underdrain laterals wherein the dispersion apertures are used to distribute both backwash water and backwash air. Many lateral underdrains of the prior art have separately dedicated backwash water and backwash air dispersion apertures, but they suffer from the defect that their coverage of the media bed on backwash is not as great as that provided by the present invention. Further, their air backwash apertures are of such small cross-sectional area that they do not truly provide any backwashing capability during water backwashing. Thus, the prior art underdrains are more prone to leaving dead spots in the media bed where either backwash water or backwash air or both is unable to reach the filter media and media support gravel for adequate cleansing.

Figure 5:
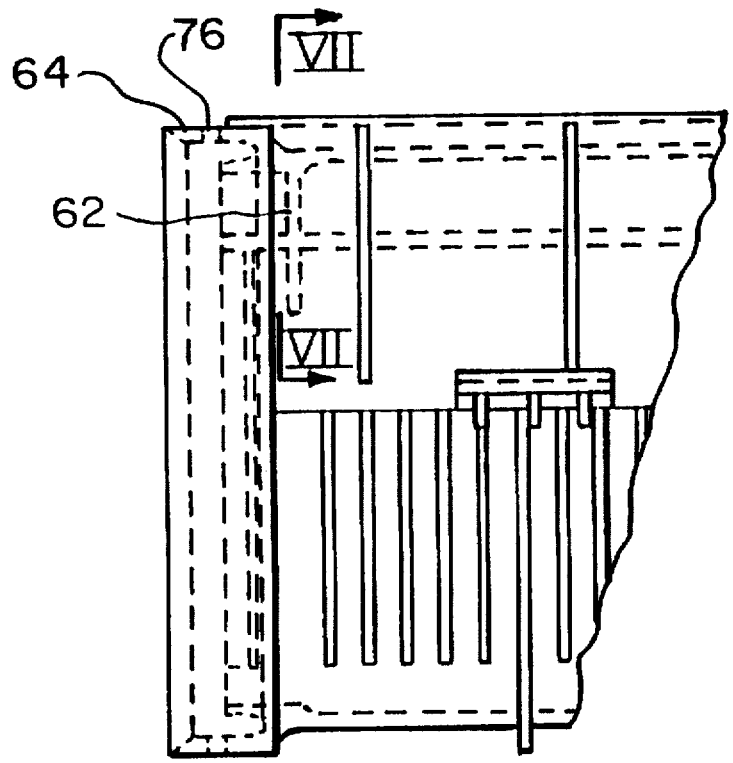
FIG. 5 is a side view, partially cut away, showing the bell end of the first embodiment of the filter underdrain block of the present invention.
Figure 6:
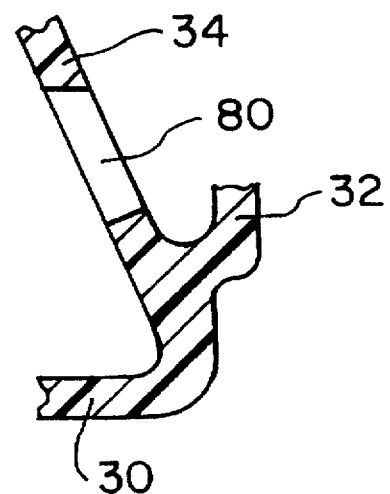
FIG. 6 is an isolation view, in cross section, of a water metering orifice according to the present invention.
Figure 7:
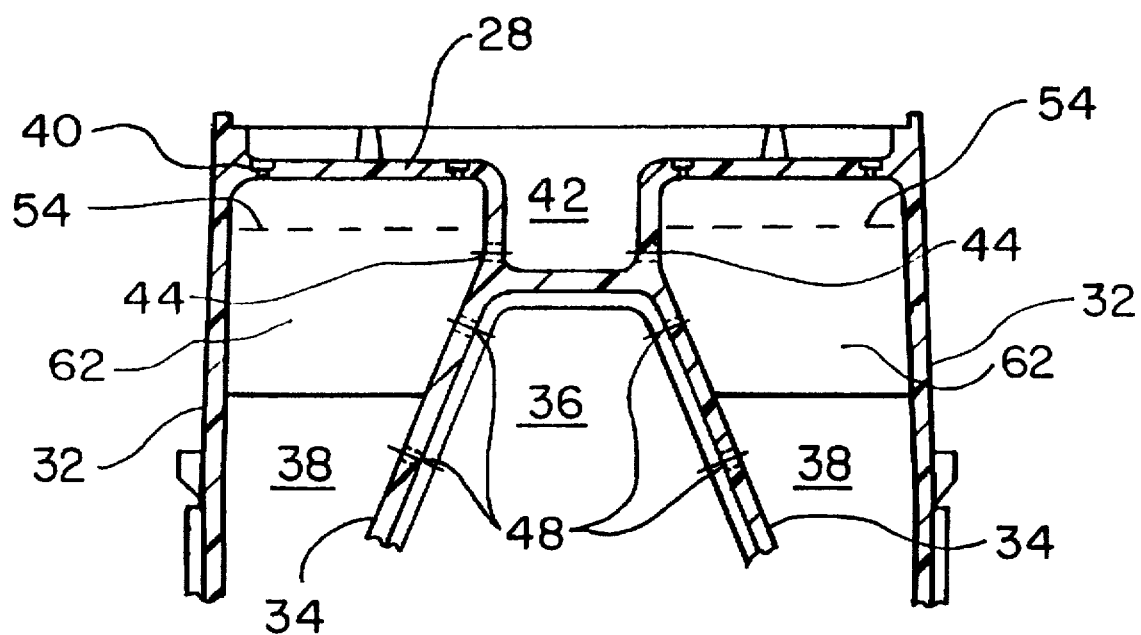
FIG. 7 is a sectional view, partially cut away, taken along lines VII—VII of FIG. 5, showing baffles according to the present invention.

Referring to FIGS. 5 and 7, baffles 62 may be included in secondary conduits 38 adjacent the bell end 64 of the underdrain block 27. The baffles extend downward into secondary conduits 38 below air/water interfaces 54. The baffles 62 prevent shifting of air below top wall 28, which might otherwise tend to build up into larger, less controllable air pockets. The secondary baffles 62 also aid in screening the gas blanket 50 from communication with orifices 44 by preventing rolling waves in process water 26, which waves may take the air/water interface 54 below the level of orifices 44.

Trough orifices 44 also aid upon shutdown of the air backwash to promote an even bleedout of any air remaining in secondary conduits 38. There is less interference between the downward proceeding water 57 and upward escaping air 52. Again, upon shutdown, the downward water will mainly proceed through the trough orifices 44.

The blocks 27 are interconnected in the following manner. Each block has a spigot end 68 and bell end 64. These are best seen in FIGS. 4 and 5. The bell end includes an alignment ridge 70 which is received in an alignment groove 72 on the spigot end. The alignment ridge 70 and the alignment groove 72 are positioned on the terminal ends of interior walls 34 to ensure proper separation of the passages 36 and 38. Spigot end 68 is received in bell end 64, and a plurality of tabs 74 are positioned on spigot end 68, to be received in windows 76 in bell end 64. Tabs 74 are received in windows 76 with a snap fit. An 0-ring 78 encircles spigot end 68 adjacent tabs 74 to ensure there are no leaks in the underdrain at the connection points.

A plurality of water metering orifices 80 are spaced along the lower portions of interior walls 34. We have found that the optimal sizing and spacing of these orifices is achieved by placing them on 6" centers along the 4-foot block with their outer dimensions, i.e., the dimensions taken on the side of wall 34 facing secondary conduit 38, being approximately ⅞" long and ⁵⁄₁₆" wide. Thus, eight such orifices are positioned in each internal wall 34 in a preferred embodiment of block 27. We have found this orifice design enhances backwash water distribution. As shown in FIG. 4, the longitudinal dimension of the orifice is in the vertical plane. The ratio of the horizontal dimension of the orifice to the thickness of the wall has been substantially reduced; therefore, the orifices 80 will direct the flow from the primary conduit 36 to the secondary conduit 38 vertically upward rather than in the same direction as in the primary conduit 36.

During water backwash, water enters primary conduits 36 and proceeds through the water metering orifices 80 to secondary conduits 38. Compensating flow in the secondary conduits 38, which is in the reverse direction of primary flow, will generally minimize maldistribution in the lateral. For further control of maldistribution, primary conduit 36 may also be fitted with a baffle 66 to control the flow of backwash water in primary conduit 36. From secondaries 38 the water rises upward through dispersion apertures 40 into the granular media 14. Importantly, all of the dispersion apertures 40 are utilized during water backwash. Normally, the water is pumped during water backwash or is delivered by a head tank and further controlled to nominal flow rates of 10–30 GPM/ft$^2$.

Figure 13:
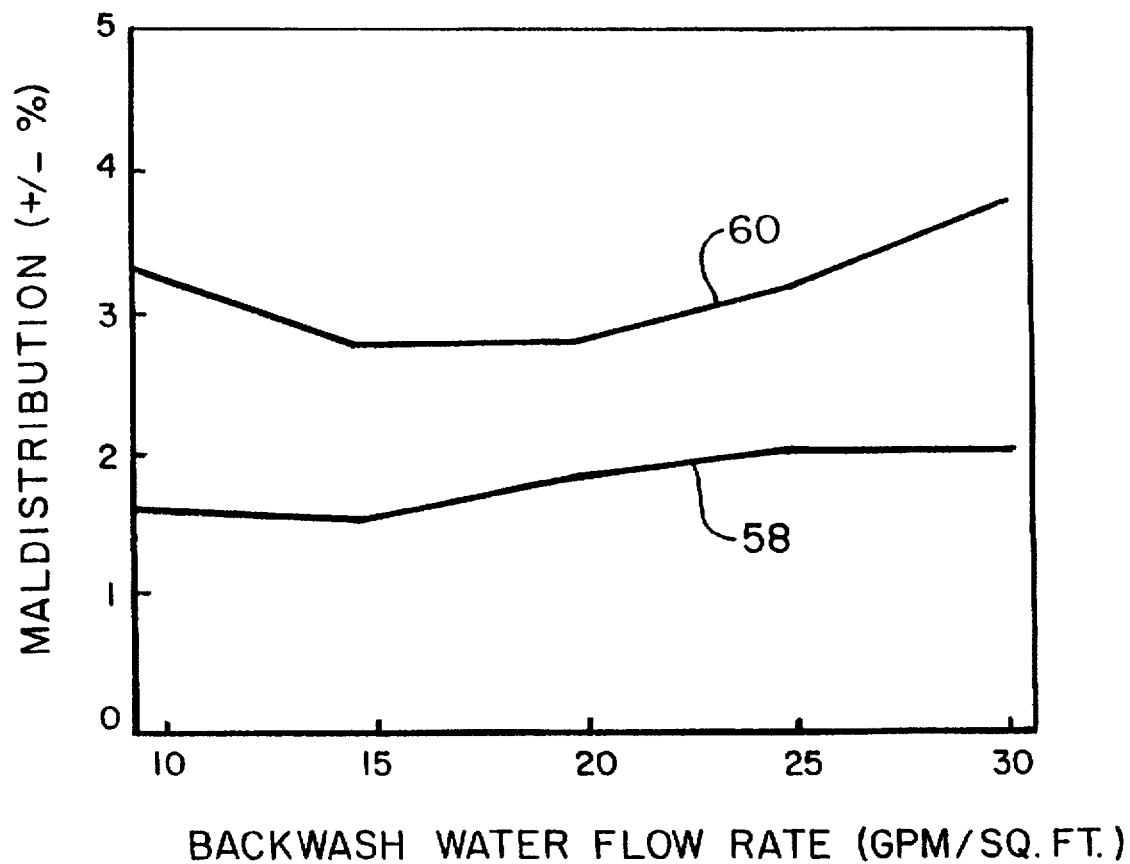
FIG. 13 is a graphic illustrating backwash water maldistribution versus flow rate for an underdrain distribution according to the present invention, as compared to that of the prior art.

Thus, the first preferred embodiment of the filter underdrain block 27 also provides an improvement in backwash water distribution, as evidenced in the graphic results shown in FIG. 13, wherein maldistribution in an underdrain lateral incorporating the invention is compared to that of a prior an underdrain lateral. As shown in FIG. 13, maldistribution of the underdrain block 27 represented by line 58 is substantially better than that of the prior art, shown at line 60, over a range of backwash water flow rates.

The actual data comprising the graph in FIG. 13 is set forth below in Table I, with an additional column indicating the percent improvement achieved by the invention.

TABLE I

Maldistribution
Preferred Embodiment vs. Prior Art
40-ft. Long Lateral

| BACKWASH FLOW RATE (GPM/sq. ft.) | PREFERRED EMBODIMENT (+/− %) | PRIOR ART (+/− %) | IMPROVEMENT (%) |
|---|---|---|---|
| 10 | 3.35 | 1.61 | 52 |
| 15 | 2.80 | 1.55 | 45 |
| 20 | 2.75 | 1.83 | 33 |
| 25 | 3.15 | 2.01 | 36 |
| 30 | 3.75 | 2.02 | 46 |

Figure 8:
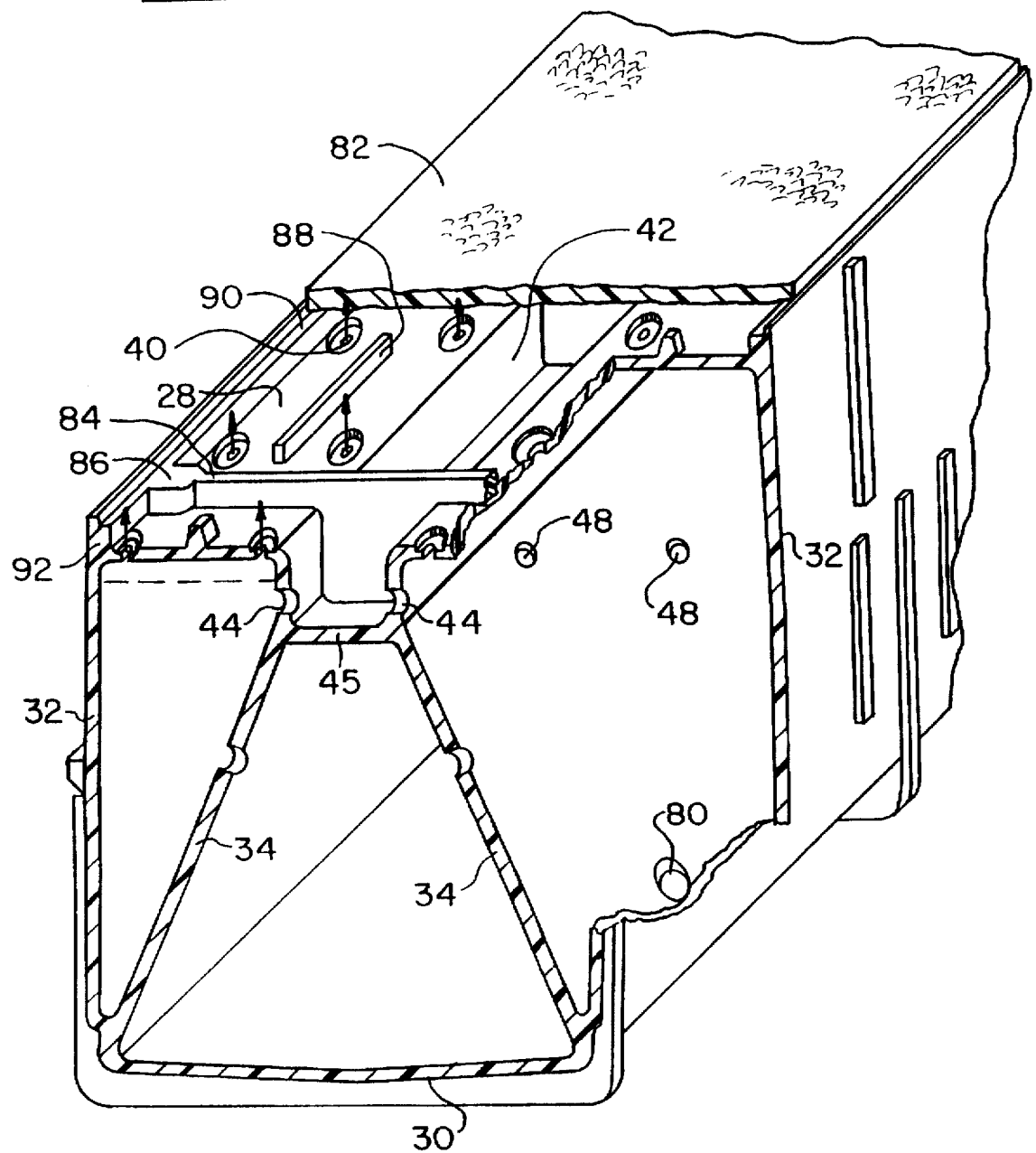
FIG. 8 is a perspective view showing a filter underdrain block according to a second embodiment of the present invention incorporating a porous plate.

A second embodiment of the invention, wherein the first embodiment described above is incorporated with a porous plate 82, is shown in FIG. 8. The porous plate rests on a plurality of ribs 84 transversely positioned across top wall 28. Ribs 84 partition the dispersion orifices 40 and the trough 42 and trough orifices 44 to define individual fluid distribution compartments. Ribs 84 have lands 86 on either end thereof, and non-contiguous support ribs 88 are positioned perpendicular to and between ribs 84. The edges of the porous plate are received in offset portions 90 of raised flanges 92. A bead of caulking or sealing agent (not shown) may be placed in offset portions 90 to ensure a proper seal between the porous plate 82 and the block 27. Further details and advantages respecting combined porous cap/filter underdrain blocks may be seen in U.S. Pat. No. 5,149,427, incorporated herein by reference. Importantly, the plate 82 is vertically spaced from dispersion apertures 40 and trough orifices 44. This vertically spaced relationship is necessary to ensure proper distribution of backwash fluids from block 27 upward through porous plate 82.

Figure 9:
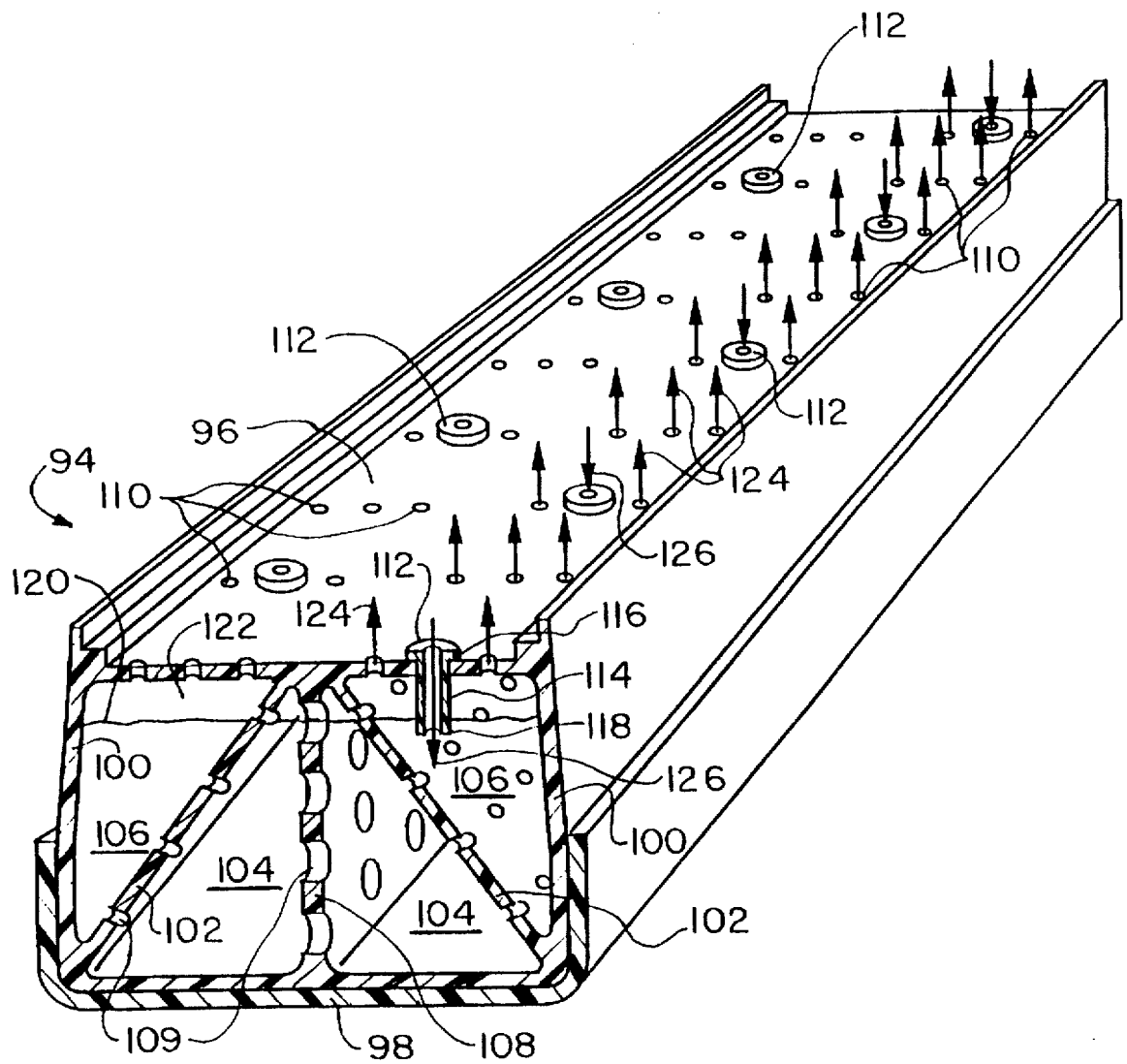
FIG. 9 is a perspective view, partially in cross section, of a filter underdrain block according to a third embodiment of the present invention.

A third embodiment of the invention is shown in FIG. 9. Block 94 includes a top wall 96, bottom wall 98, and a pair of opposed side walls 100 extending between top wall 96 and bottom wall 98. A plurality of internal walls 102 divide the hollow interior of the block 94 into a primary horizontal conduit 104 and secondary horizontal conduits 106. Secondary horizontal conduits are positioned on opposed sides of primary horizontal conduit 104. Centrally located, substantially vertical support wall 108 extends between bottom wall 98 and top wall 96. Support wall 108 is included in the block 94 because the width of block 94 is slightly greater than previous, similar block configurations. Holes are provided in the support wall 108 for air and water to communicate between the two primary conduits 104. The internal walls 102 include a plurality of metering orifices 109 for distribution of air and water to the secondary conduits 106. Vertically shaped orifices may also be provided at the bottom portion of the internal walls 102 for water distribution to the secondary conduits 106. A plurality of dispersion apertures 110 are evenly spaced across the entire surface of top wall 96. The dispersion apertures 110 communicate between the secondary conduits 106 and the overlying granular media 14. A plurality of drag water return conduits 112 are located in the top wall 96. Drag water return conduits 112 include a tube 114 with or without an upper flange 116 downwardly extending from top wall 96 into secondary conduits 106. Each tube 114 includes a discharge 118, positioned below an air/water interface 120 in the secondary conduits 106. The drag water return conduits 112 are evenly distributed across top wall 96.

During filtration and water backwash, block 94 operates similarly to the first and second embodiments of the invention described above. During air backwash, air is supplied to primary conduit 104 and metered through orifices 109 into secondary conduits 106 so that a gas blanket 122 is formed beneath top wall 96. Particularly, the air/water interface 120 is located between the top wall 96 and the discharge 118 of tube 114. Backwash gas will be directed through dispersion apertures 110 as indicated at arrows 124. Liquid from the granular media 14 side is directed downward through the drag water return conduits 112 to discharges 118, positioned below the gas blanket 122, as shown by arrows 126.

Figure 10:
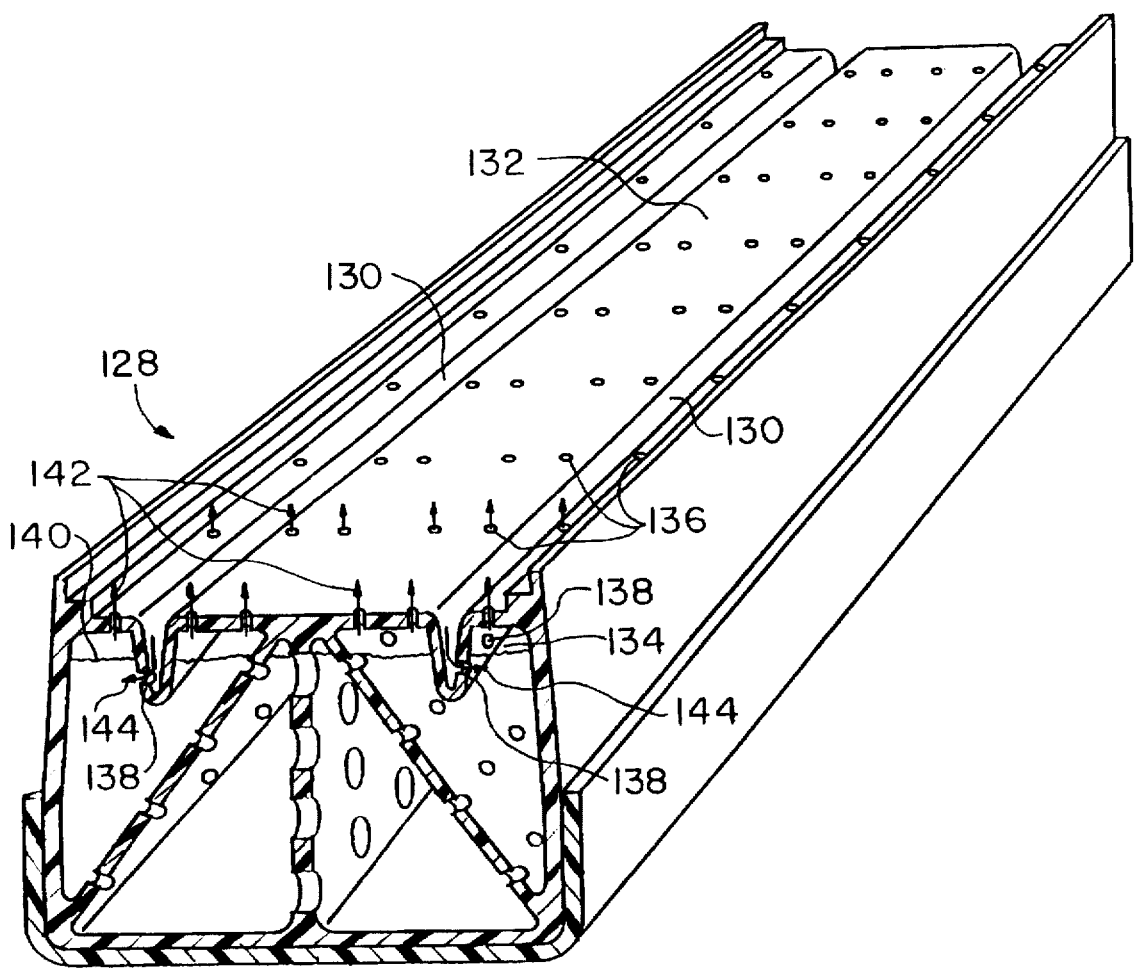
FIG. 10 is a perspective view, partially in cross section, of a filter underdrain block according to a fourth embodiment of the present invention.

A fourth embodiment of the invention is shown in FIG. 10. Block 128 includes a pair of troughs 130 in top wall 132. Gas blanket 134 is formed beneath top wall 132 during air-only backwash. Top wall 132 includes a plurality of dispersion apertures 136, and troughs 130 include trough orifices 138 in a lower portion of the troughs. Trough orifices 138 serve as drag water return conduits during air-only backwash, as described in connection with the first, second and third embodiments above.

During air-only backwash, the gas blanket defines an air/water interface 140, located between top wall 132 and trough orifices 138. Backwash air proceeds upward through dispersion apertures 136 as indicated at arrows 142 while drag water returns through trough orifices 138, positioned below the air/water interface 140, as indicated by arrows 144.

Figure 11:
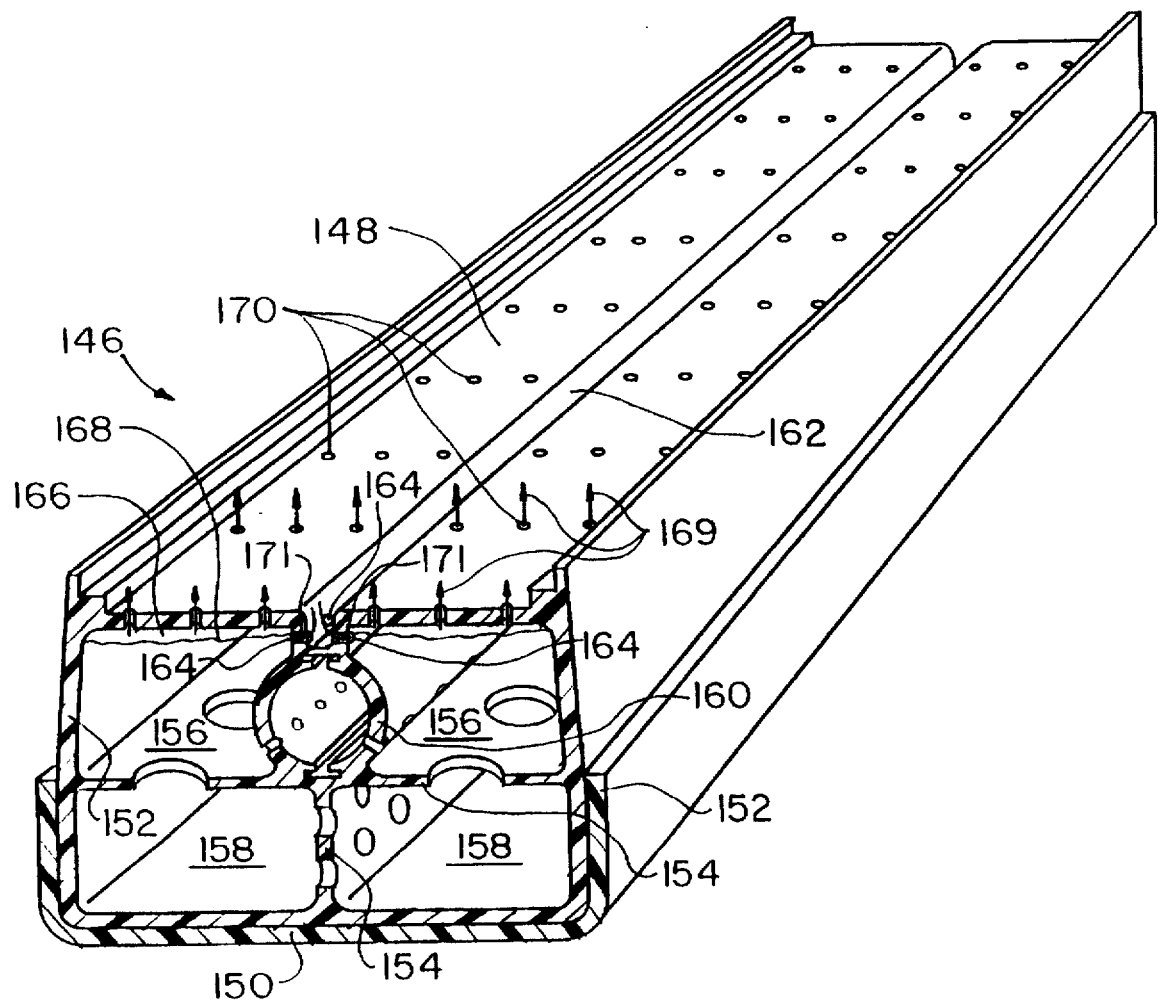
FIG. 11 is a perspective view, partially in cross section, of a filter underdrain block according to a fifth embodiment of the present invention.

A fifth embodiment of the invention is shown in FIG. 11. Block 146 includes a top wall 148, a bottom wall 150, side walls 152 and internal walls 154. The internal walls define two upper secondary conduits 156 and two lower primary conduits 158. A cylindrical primary gas conduit 160 is positioned between upper secondary conduits 156. A central trough 162 is positioned in top wall 148, having trough orifices 164 in a lower portion thereof.

In operation, air is supplied through primary gas conduit 160. From there it collects in upper secondary conduits 156 to form a gas blanket 166 beneath top wall 148. The gas blanket has an air/water interface 168 located between top wall 148 and trough orifices 164. Backwash air 169 proceeds upward through dispersion apertures 170 in top wall 148, while drag water 171 returns through trough orifices 164, located below the air/water interface 168.

Figure 12:
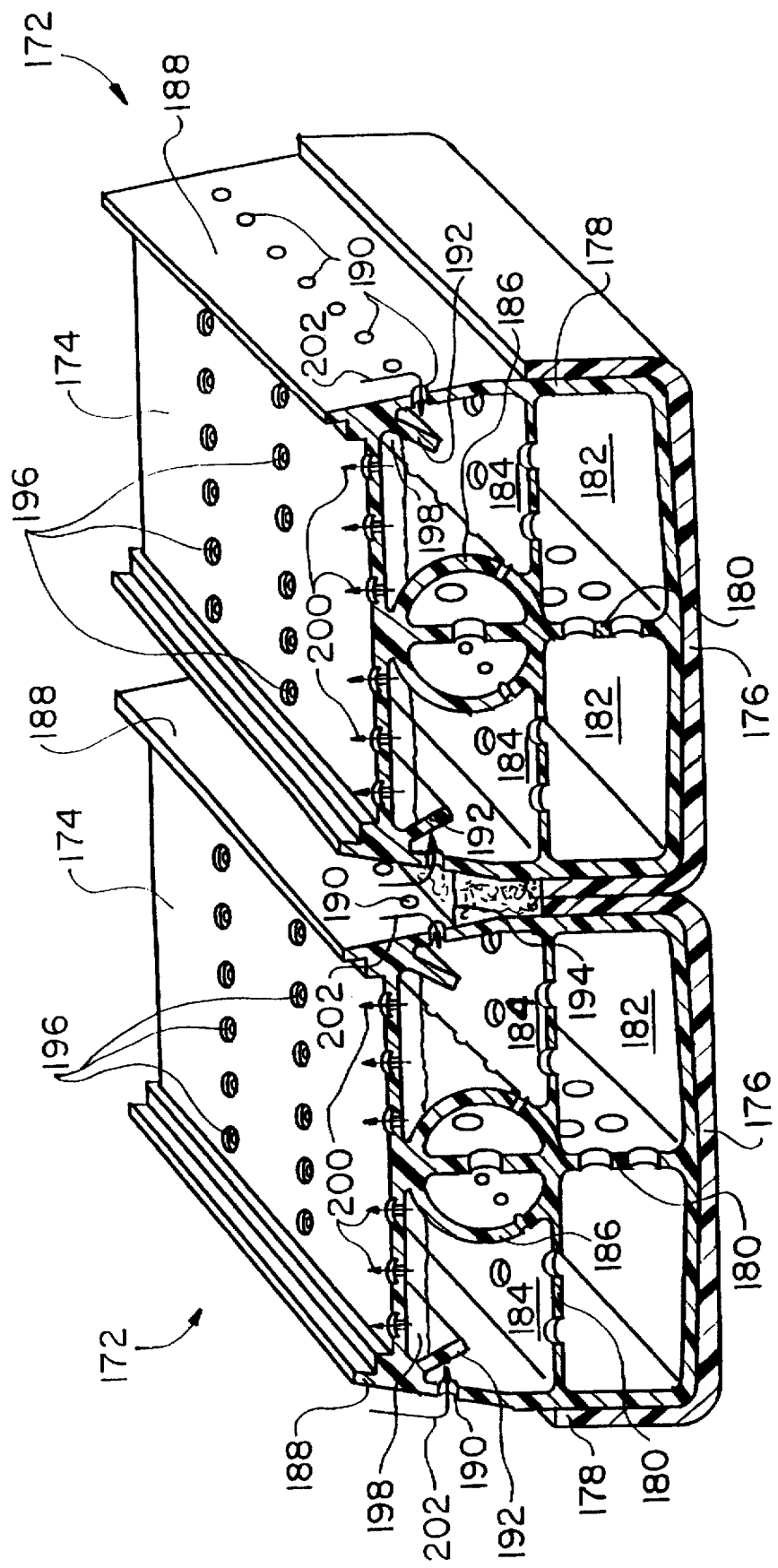
FIG. 12 is a perspective view, partially in cross section, of a filter underdrain block according to a sixth embodiment of the present invention.

Finally, a sixth embodiment of the invention is shown in FIG. 12. Blocks 172 each include top walls 174, bottom walls 176, side walls 178, and internal walls 180. The internal walls define lower primary conduits 182 and upper secondary conduits 184. A primary gas conduit 186 is positioned between upper secondary conduits 184. The side walls 178 include upper inwardly angled portions 188. These upper angled portions 188 include a plurality of water return orifices 190 positioned below dispersion apertures 170. On the internal sides of upper angled portions 188 are located baffles 192. A layer of grout 194 is shown between blocks 172. The grout level is below water return orifices 190. A plurality of dispersion apertures 196 is located in top wall 174.

In operation, backwash gas is fed to primary gas conduit 186 and metered into upper secondary conduits 184. A gas blanket 198 is formed beneath top wall 174, and the baffles 192 screen the gas blanket from communicating with water return orifices 190. Backwash air proceeds upward through dispersion apertures 196 while drag water returns through water return orifices 190, as indicated by arrows 200 and 202, respectively.

The features and advantages of the first and second embodiments of the invention described above may also be incorporated with the third through sixth embodiments of the invention. For brevity, these details have not been discussed herein in connection with all embodiments of the invention. The specific block designs illustrated in FIGS. 2–8 and 10–12 provide the advantage that the liquid return conduits may be easily incorporated therein by extrusion manufacturing processes. The block design shown in FIG. 9 provides the advantage that this construction allows for retrofitting existing underdrain systems by manufacturing individual tubes 114 which can be installed on existing underdrain blocks.

In all of the above-described embodiments of the invention, except that shown in FIG. 9, the drag water return conduit discharge may in some cases be positioned above or below the air/water interface in the secondary conduits. This is because the static head of process water above the drag water return conduit discharge will facilitate proper flow of drag water return, notwithstanding the pressure of the uprising backwash air.

To further understand the problem solved by the invention, and to prove the efficacy of adding liquid return conduits to lateral air/water underdrains, the applicants conducted a number of tests, set forth in the examples below.

EXAMPLE I

During the course of developing a new underdrain block, it was observed that differential surface energy zones were created during air-only backwash in an 8-foot long, submerged test lateral. These differential energy zones were more obvious at low air flow rates and generally set up in the same places along the test lateral. These zones were apparently caused by excessive channeling of rising air and returning water. It was supposed that the upward moving air through the top deck orifices created a sufficient drag force which carried some amount of water up through the top deck and out the orifices, perhaps resulting in surface hot zones. In the lighter zones, it was thought that make-up or return water flowed downwards into the underdrain, blocking certain orifices and therefore restricting free air flow.

To prove the prior presumptions, it was decided to develop means to carry the makeup or return water from above the top deck back to the body of water inside the lateral without interfering with the movement of air through the top deck orifices. Thus, ⅛" diameter holes were drilled at 12" centers along the length of the lateral, through the side walls of the lateral into the secondary compartment below the air/water interface. Air was again introduced to the lateral for the confirmation test, and it was found that the differential surface energy zones had disappeared and surface turbulence had visibly equalized. It was concluded that the upward movement of air streams indeed had carried water up to the top deck and out the secondary orifices, and external water was required to make up these losses, causing orifices to be blocked, in turn causing differential surface turbulence or energy zones.

EXAMPLE II

Twelve ¼" inner diameter by 2" long plastic tubes were installed through the top deck of a 4-foot test block. There were ninety-two 7/32" diameter orifices on the top deck of the block.

Initially, all water returning tubes were sealed, and air was introduced to the test block at the rate of 2 cfm/ft². A number of orifices that were either "dead" or passed air only intermittently were then counted. This counting was repeated at 3, 4, and 5 cubic feet per minute per square foot flow rates. The air supply was then shut off, and the behavior of the air bubbles was observed.

After all of the air had let out, the seals were removed from six water returning tubes, and air was again pumped into the lateral at the 2, 3, 4, and 5 cfm/ft² flow rates. Finally, the seals were removed from the remaining six tubes so that all twelve were open, and the air was introduced at the same flow rates. The number of dead and intermittent orifices was counted at each flow rate for both the 6-tube and 12-tube conditions. The results are recorded in Table II below.

TABLE II

PLEXIGLAS ™ Test Model with Water Returning Tubes
Top Deck Orifices, (92) - 7/32" diameter = 3.458 sq. in.
Water Returning Tubes,
(12) - 1/4" diameter = 0.589 sq. in.

| WATER RETURN-ING TUBES | | NUMBER OF ORIFICES INTERRUPTED | | | | % OF ORIFICES INTERRUPTED | | | |
|---|---|---|---|---|---|---|---|---|---|
| | | 2 | 3 | 4 | 5 | 2 | 3 | 4 | 5 |
| No. of Tubes | % | cfm/ft² | cfm/ft² | cfm/ft² | cfm/ft² | cfm/ft² | cfm/ft² | cfm/ft² | cfm/ft² |
| 0 | 0 | 65 | 44 | 30 | 16 | 69.1 | 46.8 | 31.9 | 17.0 |
| 6 | 8.5 | 38 | 24 | 14 | 8 | 40.4 | 25.5 | 14.9 | 8.5 |
| 12 | 17.0 | 24 | 16 | 8 | 6 | 25.5 | 17.0 | 8.5 | 6.4 |

EXAMPLE III

A water return trough was provided in a central portion of the top deck of the test lateral. The ¼" diameter water returning holes were positioned in a lower portion of the trough, six on each side of the trough. The top deck contained ninety-two 7/32" diameter orifices.

Initially, all of the water return orifices in the trough were sealed, and air was introduced at the same rates present in Example II above. Observations were recorded. The seals were then removed from six of the water returning holes, and the test lateral was again exposed to the varying flow rates while observations were recorded. Finally, seals from the remaining six holes were removed, and observations were recorded at the same flow rates. The observations are set forth in Table III below.

TABLE III

PLEXIGLAS ™ Test Model with Water Returning Holes
Top Deck Orifices, (92) - 7/32" diameter = 3.458 sq. in.
Water Returning Holes,
(12) - 1/4" diameter = 0.589 sq. in.

| WATER RETURN-ING TUBES | | NUMBER OF ORIFICES INTERRUPTED | | | | % OF ORIFICES INTERRUPTED | | | |
|---|---|---|---|---|---|---|---|---|---|
| | | 2 | 3 | 4 | 5 | 2 | 3 | 4 | 5 |
| No. of Holes | % | cfm/ft² | cfm/ft² | cfm/ft² | cfm/ft² | cfm/ft² | cfm/ft² | cfm/ft² | cfm/ft² |
| 0 | 0 | 69 | 47 | 28 | 20 | 75.0 | 51.0 | 30.4 | 21.7 |
| 6 | 8.5 | 38 | 28 | 12 | 6 | 41.3 | 30.4 | 13.0 | 6.5 |
| 12 | 17.0 | 18 | 16 | 0 | 0 | 19.6 | 17.4 | 0 | 0 |

It can be seen from Examples I–III above that the percent of orifices interrupted decreases with an increase in the number of water returning tubes/holes, and the decrease in the number of interrupted orifices is more obvious at the lower air flow rates. In other words, water returning tubes/holes contribute a great deal of improvement to the uniform distribution of air through the orifices. It should be noted, however, that overapplication of water return conduits could lead to deleterious effects on water and/or air backwash distribution. The water returning holes, as discussed in Example III above, are more effective than the water returning tubes discussed in Example II because the holes have lower friction losses than do the tubes.

It was also seen in connection with the above examples that the remaining air in the underdrain block, when the air supply was terminated, was released more uniformly and more gently from the top deck orifices when water returning devices were provided. Most of the replacement water transfers into the underdrain block through the water returning tubes or holes. As a result, more orifices are open for emitting the air.

It was noticed that the return of water from the water return tubes was somewhat interrupted when the air/water interface dropped below the discharge of the tubes about 30 to 40 seconds after the termination of the air supply. There were no such problems observed with respect to the trough and hole arrangement.

It should be noted that the Figures directed to the third-sixth embodiments of the invention are schematic in nature, and additional derails set forth regarding the first and second embodiments may also be applied to the latter embodiments. For example, it will be clear upon reading the above detailed description that the bell end/spigot end arrangement, the support ribs, the dispersion aperture sizing and spacing, the porous plate, etc. may be applied to the latter embodiments with equal success, as set forth in respect to the first and second embodiments.

To summarize, the present invention provides an improvement in performance over the prior art combined air/water lateral underdrains, as follows:

1. There is a substantial reduction in water maldistribution, as set forth in FIG. 13. The average reduction in water maldistribution was 42%, compared to prior dual lateral air/water underdrain arrangements.
2. There is a substantial improvement in air distribution. Excellent distribution is observed over a wider air flow range of 1–5 scfm/ft$^2$ along a 40-foot test lateral. Dead spots are substantially eliminated at 6" water submergence. Good air distribution was observed at the low rate of ½ scfm/ft$^2$ for a 40-foot test lateral.
3. Uncontrolled air entering the filter through the backwash water line is divided more evenly along the length of the lateral. Concentration of the uncontrolled air is therefore reduced.
4. Level sensitivity is reduced. No adverse effect on water maldistribution was observed, even when one end of the 40-foot test lateral was 1" higher than the other. Nor was an adverse effect on air distribution observed when one end of the 40-foot lateral was ½" higher than the other. Installation level tolerances can be set at ±¼" without adverse effects.

While the current best mode and preferred embodiments of applicants' invention have been described with particularity herein, it will be understood by those of ordinary skill in the art that modifications may be made without departing from the spirit and scope of the present invention. For example, the disclosed water return conduits may be incorporated in various known lateral underdrain block designs with support gravel and/or porous media support plates. The invention may be applied to underdrains for use with either fluidizing or non-fluidizing media. Furthermore, variations may include a combination of troughs and tubes as drag water return conduits. Consequently, the scope of the present invention is intended to be limited only by the appended claims.

What is claimed is:

1. A method of backwashing a filter media comprising supplying a gas under pressure into an underdrain block submerged in a process liquid, forming a pocket of pressurized gas in the liquid below an upper wall of the underdrain block, said upper wall containing dispersion apertures, passing pressurized gas from said pocket through the dispersion apertures in the upper wall of the underdrain block and through the filter media, said pressurized gas drawing at least a portion of said liquid from below said upper wall through said dispersion apertures, removing at least a portion of the liquid from above the underdrain block and returning said removed portion of liquid to the interior of the underdrain block at a location removed from the pocket of pressurized gas.

2. The method of claim 1 including the subsequent step of supplying a cleaning liquid under pressure into the underdrain block and passing the cleaning liquid through the said dispersion apertures through which the pressurized gas passed and into the filter media.

3. The method of claim 1 including the step of supplying a cleaning liquid under pressure and a cleaning gas under pressure concurrently into the underdrain block and passing the combined liquid and gas through the said dispersion apertures and into the filter media.

4. A method of backwashing a filter media comprising supplying a gas under pressure into an underdrain block containing a liquid, forming a pocket of pressurized gas in the liquid in communication with a wall of the underdrain block containing dispersion apertures, said dispersion apertures capable of engaging both backwash liquid and backwash gas to the same filter media area and depth, passing pressurized gas through the dispersion apertures in the wall of the underdrain block and into the filter media, and conveying liquid from the exterior of the underdrain block to the interior of the underdrain block at a location in the liquid in the underdrain block removed from the pocket of pressurized gas.

5. The method of claim 4 including the subsequent step of supplying a cleaning liquid under pressure into the underdrain block and passing the cleaning liquid through the said dispersion apertures through which the pressurized gas passed and into the filter media.

6. The method of claim 4 including the step of supplying a cleaning liquid under pressure and a cleaning gas under pressure concurrently into the underdrain block and passing the combined liquid and gas through the said dispersion apertures and into the filter media.

7. A method of gas backwash for use in a combined gas/liquid lateral underdrain having a filter media located above the underdrain that improves gas distribution over a gas flow range comprising:

creating a hollow interior area in the underdrain;

providing fluid communication between the hollow interior and filter media located above it;

forming a pocket of gas in the hollow interior and controllably delivering gas and a portion of liquid contained in the hollow interior from the hollow interior of the underdrain to the filter media; and returning liquid to the hollow interior at a point below the pocket of gas so as not to interfere substantially with gas or liquid movement from the hollow interior into the filter media.

8. The method of claim 7 wherein said gas flow range is 0.5 to 5 standard cubic feet per minute per square foot of filter area.

9. A filtration system comprising a filtration media for filtering a process liquid, an underdrain including a plurality of underdrain blocks for draining a process liquid from the filtration media and for backwashing the filtration media by a gas-only backwash, a combined gas-liquid backwash and a liquid-only backwash, a gas inlet for supplying gas under pressure to the underdrain and a liquid inlet for supplying liquid under pressure to the underdrain;

said underdrain blocks comprising:

a primary conduit having a plurality of metering orifices therein;

a secondary conduit into which gas and liquid may be metered from the primary conduit;

a plurality of dispersion apertures in an upper wall of the secondary conduit, all of said dispersion apertures utilized to selectively disperse liquid-only backwash, gas-only backwash and combined gas-liquid backwash, said dispersion apertures having a spacing and a size such that:

during liquid-only backwash, a total overall headloss incurred by said liquid backwash upon passage through said underdrain including passage through said dispersion apertures at a flowrate of about 20 gallons per minute per square foot of filter area is within a range of about 15 inches of water column to about 40 inches of water column, and during gas-only backwash, a pocket of pressurized gas is formed beneath the apertures; and a liquid return conduit for conveying liquid on the exterior of the underdrain block to the interior of the underdrain block at a location removed from the pocket of pressurized gas during gas-only backwash.

* * * * *

UNITED STATES PATENT AND TRADEMARK OFFICE
CERTIFICATE OF CORRECTION

PATENT NO. : 5,639,384
DATED : June 17, 1997
INVENTOR(S) : Marvin A. Brown, Eugen O. Bergmann, Richard Hsieh It is certified that error appears in the above-indentified patent and that said Letters Patent is hereby corrected as shown below:

Title Page, [75] Inventors, address of third inventor, Richard Hsieh, delete "Sewickley" and insert --Cranberry Township--.

Column 1 Line 6 "Pat. No. 5,499,388" should read --Pat. No. 5,489, 388--.

Column 5 Line 53 "din" should read --dirt--.

Column 10 Line 13 "wails" should read --walls--.

Signed and Sealed this

Sixteenth Day of September, 1997

Attest:

BRUCE LEHMAN

Attesting Officer

Commissioner of Patents and Trademarks